(12) United States Patent
Merker et al.

(10) Patent No.: US 9,508,491 B2
(45) Date of Patent: Nov. 29, 2016

(54) METHOD FOR IMPROVING ELECTRICAL PARAMETERS IN CAPACITORS COMPRISING PEDOT/PSS AS A SOLID ELECTROLYTE THROUGH A POLYALKYLENE GLYCOL

(75) Inventors: Udo Merker, Köln (DE); Katrin Asteman, Köln (DE); Matthias Intelmann, Köln (DE); Armin Sautter, Düsseldorf (DE)

(73) Assignee: HERAEUS DEUTSCHLAND GMBH & CO. KG (DE)

( * ) Notice: Subject to any disclaimer, the term of this patent is extended or adjusted under 35 U.S.C. 154(b) by 791 days.

(21) Appl. No.: 13/877,231

(22) PCT Filed: Sep. 30, 2011

(86) PCT No.: PCT/EP2011/004880
§ 371 (c)(1),
(2), (4) Date: Jul. 10, 2013

(87) PCT Pub. No.: WO2012/041506
PCT Pub. Date: Apr. 5, 2012

(65) Prior Publication Data
US 2013/0279079 A1    Oct. 24, 2013

Related U.S. Application Data

(60) Provisional application No. 61/392,264, filed on Oct. 12, 2010.

(30) Foreign Application Priority Data

Oct. 1, 2010    (DE) .................. 10 2010 047 087

(51) Int. Cl.
*H01G 9/00*    (2006.01)
*H01G 9/028*    (2006.01)
(Continued)

(52) U.S. Cl.
CPC .......... *H01G 9/0029* (2013.01); *H01G 9/0036* (2013.01); *H01G 9/028* (2013.01);
(Continued)

(58) Field of Classification Search
None
See application file for complete search history.

(56) References Cited

U.S. PATENT DOCUMENTS 4,858,078 A    8/1989    Morimoto et al.
4,910,645 A    3/1990    Jonas et al.
(Continued)

FOREIGN PATENT DOCUMENTS

CN    1316792 A    10/2001
CN    101106021 A    1/2008
(Continued)

OTHER PUBLICATIONS

XP003025929, Conductive Polymer Products Baytronics, "Baytron P", No. PD-6002, (2002), pp. 1-2.
(Continued)

*Primary Examiner* — Scott B Geyer
(74) *Attorney, Agent, or Firm* — Drinker Biddle & Reath LLP (57) ABSTRACT

The invention is relates to a method for manufacturing a capacitor. The method has the following steps:
a) providing an electrode body made of an electrode material, wherein a dielectric at least partially covers a surface of the electrode material, to obtain an anode body;
b) introducing a dispersion, which contains particles of an electrically conductive polymer with a particle size (d50) of 70 nm and less and a dispersing agent, into at least a part of the anode body;
c) at least partial removing the dispersing agent, to obtain a capacitor body; and
d) introducing, into the capacitor body, a polyalkylene glycol or a polyalkylene glycol derivative or a combination of at least two thereof as an impregnating agent.

17 Claims, 1 Drawing Sheet

(51) Int. Cl.
    *H01G 11/48* (2013.01)
    *H01G 11/56* (2013.01)
    *H01G 9/15* (2006.01)

(52) U.S. Cl.
    CPC ............. *H01G 11/48* (2013.01); *H01G 11/56* (2013.01); *H01G 9/15* (2013.01); *Y02E 60/13* (2013.01); *Y10T 29/43* (2015.01)

(56) References Cited

U.S. PATENT DOCUMENTS

| | | | |
|---|---|---|---|
| 6,183,618 B1 * | 2/2001 | Melody | H01G 9/0029 205/115 |
| 6,623,891 B2 | 9/2003 | Yamasaki | |
| 7,497,879 B2 | 3/2009 | Kakuma et al. | |
| 8,313,538 B2 | 11/2012 | Merker et al. | |
| 2009/0109602 A1 | 4/2009 | Kakuma et al. | |
| 2010/0165546 A1 | 7/2010 | Yoshida et al. | |
| 2011/0128675 A1 | 6/2011 | Merker et al. | |
| 2011/0164348 A1 | 7/2011 | Merker et al. | |
| 2012/0075772 A1 | 3/2012 | Merker et al. | |
| 2013/0070392 A1 | 3/2013 | Merker et al. | |

FOREIGN PATENT DOCUMENTS

| | | |
|---|---|---|
| DE | 102005043828 A1 | 3/2007 |
| DE | 102008032578 A1 | 1/2010 |
| EP | 340512 A2 | 11/1989 |
| EP | 899757 A2 | 3/1999 |
| JP | 01-205414 A | 8/1989 |
| JP | 02-207518 A | 8/1990 |
| JP | 03-093218 A | 4/1991 |
| JP | 2005109252 A | 4/2005 |
| JP | 2008109065 A | 5/2008 |
| JP | 2008109068 A | 5/2008 |
| JP | 2008109069 A | 5/2008 |
| JP | 2009-508342 A | 2/2009 |
| JP | 2009111174 A | 5/2009 |
| JP | 2010-157555 A | 7/2010 |
| WO | WO-2007031207 A1 | 3/2007 |
| WO | WO-2007097364 A1 | 8/2007 |
| WO | WO-2009141209 A1 | 11/2009 |
| WO | WO-2010003874 A2 | 1/2010 |

OTHER PUBLICATIONS

International Search Report for PCT/EP2011/004880 mailed Apr. 12, 2012.

* cited by examiner

METHOD FOR IMPROVING ELECTRICAL PARAMETERS IN CAPACITORS COMPRISING PEDOT/PSS AS A SOLID ELECTROLYTE THROUGH A POLYALKYLENE GLYCOL

CROSS-REFERENCE TO RELATED APPLICATIONS

This application is a national stage application (under 35 U.S.C. §371) of PCT/EP2011/004880, filed Sep. 30, 2011, which claims benefit of German application 10 2010 047 087.2, filed Oct. 1, 2010, and U.S. Provisional Application No. 61/392,264, filed Oct. 12, 2010 which are all incorporated by reference.

BACKGROUND OF THE INVENTION

The present invention relates to a method for manufacturing an electrolytic capacitor, and an electrolytic capacitor manufactured with this method, the use of this electrolytic capacitor, and electronic circuits.

A standard electrolytic capacitor generally consists of a porous metal electrode, an oxide layer disposed on the metallic surface, an electrically conductive material, generally a solid, which is introduced into the porous structure, an external electrode (contact), such as a silver layer, and other electrical contacts and an encapsulation. One frequently used electrolytic capacitor is the tantalum electrolytic capacitor, of which the anode electrode is made from the valve metal tantalum, on which a uniform, dielectric layer of tantalum pentoxide has been produced through anodic oxidation (also referred to as "forming"). A liquid or solid electrolyte forms the cathode of the capacitor. Aluminium capacitors, of which the anode electrode is made from the valve metal aluminium, on which a uniform, electrically insulating aluminium oxide layer is produced as a dielectric by means of anodic oxidation, are also frequently used. Here also, a liquid electrolyte or a solid electrolyte form the cathode of the capacitor. The aluminium capacitors are generally embodied as wound capacitors or stack-type capacitors.

In view of their high electrical conductivity, π-conjugated polymers are particularly suitable as solid electrolytes in the capacitors described above. π-conjugated polymers are also referred to as conductive polymers or as synthetic metals. They are gaining increasing commercial significance because, by comparison with metals, polymers have advantages with regard to processing, weight and the selective adjustment of properties through chemical modification. Examples of known π-conjugated polymers include polypyrroles, polythiophenes, polyanilines, polyacetylenes, polyphenylenes and poly(p-phenylene-vinylenes), wherein poly(3,4-ethylenedioxythiophene) (PEDOT) is a particularly important polythiophene which is used technically, because it has a very high conductivity in its oxidised form.

The application of the solid electrolytes based on conductive polymers to the oxide layer can be performed in different ways. For example, EP-A-0 340 512 describes the manufacture of a solid electrolyte from 3,4-ethylenedioxythiophene and its use in electrolyte capacitors. According to the teaching of this specification, 3,4-ethylenedioxythiophene is polymerised in situ on the oxide layer. After the depositing of the polymer solid electrolyte, the oxide layer of the capacitor must generally be reformed in order to achieve low residual currents, as described, for example, in EP-A-0 899 757. For this purpose, the capacitor is immersed in an electrolyte and exposed to an electric voltage, which does not exceed the anodisation voltage of the oxide film.

However, the disadvantage of manufacturing solid electrolytic capacitors using in situ polymerisation is to be seen, inter alia, in the complexity of the process. Accordingly, a polymerisation process, which includes respectively the method steps of immersion, polymerisation and washing, generally takes several hours. In this context, explosive or toxic solvents may under some circumstances have to be used. A further disadvantage of the in situ method for manufacturing solid electrolytic capacitors is that anions of the oxidation medium or optionally other monomer anions are used as counterions for the conductive polymer. However, because of their small size, these are not bound in a sufficiently stable manner to the polymer. Accordingly, especially at high operating temperatures of the capacitor, a diffusion of the counterions can occur and therefore an increase in the equivalent series resistance (ESR) of the capacitor. The alternative use of high-molecular polymer counterions in chemical in situ polymerisation does not achieve sufficiently conductive films and therefore does not achieve low ESR values.

In the prior art, alternative methods for manufacturing solid electrolytes based on conductive polymers in electrolytic capacitors have therefore been developed. For example, DE-A-10 2005 043828 describes a method for manufacturing solid electrolytes in capacitors, in which a dispersion comprising the already polymerised thiophene, for example, the PEDOT/PSS dispersions known from the prior art, is applied to the oxide layer, and then the dispersion medium is removed by evaporation. However, there is a requirement to increase further the breakdown voltage, which is a measure for the reliability of an electrolytic capacitor, especially for high operating voltages. The breakdown voltage is the voltage at which the dielectric (oxide layer) of the capacitor no longer withstands the electrical field strength and electrical breakdowns occur between the anode and the cathode, which leads to a short circuit in the capacitor. The higher the breakdown voltage is, the better the quality of the dielectric and therefore also the more reliable the capacitor is. Moreover, the rated voltage at which the capacitor can be used is higher, the higher the breakdown voltage of the capacitor is.

An increase of the breakdown voltage can be achieved in aluminium capacitors according to the doctrine of WO-A-2007/097364, JP 2008-109065, JP 2008-109068 or JP 2008-109069, for example, by adding ion-conducting substances, such as polyethylene glycols to the polymer dispersions which are used to manufacture the solid electrolyte layer before the application of the dispersion to the oxide layer. The disadvantage of this approach, however, is that, although the breakdown voltage of the capacitor can be improved, this improvement is associated with an undesirably strong decline in the capacitance of the capacitor at low temperatures.

In addition to the addition of polyethylene glycols to the polymer dispersion, in the context of so-called "hybrid capacitors", which provide a combination of a solid electrolyte and a liquid electrolyte, it is also known, for example, from U.S. Pat. No. 7,497,879 B2 or JP 2009-111174, to impregnate the solid electrolytes, after they have been applied to the oxide layer, with a solution comprising γ-butyrolactone or sulfolane, in order to increase the capacitance yield and accordingly reduce the residual current in this manner. Such capacitors also show an undesirably large reduction in the capacitance at low temperatures. Furthermore, the components used in U.S. Pat. No. 7,497,879 B2 or JP 2009-111174 volatilise on increasing the temperature of the capacitor, which can occur with normal use in a component or during the manufacturing process of the capacitor, which leads to a drying-out of such a hybrid capacitor.

BRIEF SUMMARY OF THE INVENTION

The present invention was based on the object of overcoming the disadvantages resulting from the prior art in connection with capacitors, especially in connection with solid electrolytic capacitors, particularly preferably in connection with the aluminium capacitors known from the prior art.

In particular, the present invention was based on the object of providing a method for manufacturing a capacitor, by means of which capacitors can be manufactured, which have the highest possible breakdown voltage at the same time as a small reduction of capacitance at low temperatures, in order in this manner to comply with important requirements in the electrical industry.

The manufacturing method for the advantageous capacitors described above should also be further distinguished in that it allows the manufacture of these capacitors in the simplest possible manner, in particular with the fewest possible method steps.

A contribution towards the solution of the objects named above is achieved by a method for manufacturing a capacitor, preferably an electrolytic capacitor, comprising the following method steps:

a) provision of a preferably porous electrode body made of an electrode material, wherein a dielectric at least partially covers a surface of this electrode material, to obtain an anode body;

b) introduction of a dispersion, which comprises particles of an electrically conductive polymer with a particle size ($d_{50}$) of 70 nm and less and a dispersing agent, into at least a part of the anode body;

c) at least partial removal of the dispersing agent to obtain a capacitor body;

d) introduction, into the capacitor body, of a polyalkylene glycol or a polyalkylene glycol derivative or a combination of at least two thereof as an impregnating agent.

A DETAILED DESCRIPTION OF THE INVENTION

It was determined that polyalkylene glycols or polyalkylene glycol derivatives as impregnating agents, which are introduced into a capacitor body already impregnated with conductive polymers, lead, in a completely surprising manner, to a significant improvement in the breakdown voltage of the capacitor. Surprisingly it was also possible in this way to reduce significantly the change in the electrical capacitance of the capacitor at low temperatures.

In method step a) of the method according to the invention, an electrode body made of an electrode material is first prepared, wherein a dielectric at least partially covers the surface of this electrode material.

In principle, the electrode body can be manufactured in that a valve-metal powder with a high surface area is pressed and sintered to form a mostly porous electrode body. In this context, an electrical contact wire preferably made from a valve metal, such as tantalum, is conventionally pressed into the electrode body. The electrode body is then coated with a dielectric, that is, an oxide layer, for example, by electrochemical oxidation. As an alternative, metal films can be etched and coated with a dielectric by electrochemical oxidation in order to obtain an anode film with a porous region. In the case of a wound capacitor, an anode film with a porous region, which forms the electrode body, and a cathode film are separated by separators and wound up.

Within the scope of the invention, metals of which the oxide coatings do not allow the flow of current uniformly in both directions are understood as valve metals. With a voltage applied at the anode, the oxide layers of the valve metals block the flow of current, while in the case of a voltage applied to the cathode, considerable currents occur, which can destroy the oxide layer. The valve metals include Be, Mg, Al, Ge, Si, Sn, Sb, Bi, Ti, Zr, Hf, V, Nb, Ta and W and an alloy or compound of at least one of these metals with other elements. The most well-known representatives of the valve metals are Al, Ta and Nb. Combinations of electrical properties comparable with a valve metal are those with metallic conductivity, which can be oxidised and of which the oxide layers provide the properties described above. For example, NbO shows metallic conductivity, but is not generally regarded as a valve metal. However, layers of oxidised NbO show the typical properties of valve-metal oxide layers, so that NbO or an alloy or compound of NbO with other elements are typical examples of such compounds with electrical properties comparable with a valve metal. Electrode materials made of tantalum, aluminium and such electrode materials which are based on niobium or niobium oxide are preferred. Aluminium is particularly preferred as an electrode material.

For the manufacture of the electrode body often with a porous region, the valve metals can be sintered, for example, in powdered form to provide a generally porous electrode body, or alternatively, a porous structure is imprinted onto a metallic body. The latter can be implemented, for example, by etching a film.

In the following, for the sake of simplicity, bodies with a porous region are also referred to as porous. For example, electrode bodies with a porous region are also referred to as porous electrode bodies. On the one hand, the porous bodies can be penetrated by a plurality of channels and therefore be sponge-like. This is often the case if tantalum is used in the construction of the capacitor. On the other hand, pores can be present only at the surface, and the region disposed below the surface pores can be formed in a solid manner. This is often observed, if aluminium is used in the capacitor construction.

The often porous electrode bodies manufactured in this manner are then oxidised, for example in an appropriate electrolyte, for example, phosphoric acid or an aqueous solution of ammonium adipate, by applying a voltage, in order to form the dielectric. The size of this forming voltage is dependent upon the oxide-layer thickness to be achieved or respectively the subsequent operating voltage of the capacitor. Preferred forming voltages lie in a range of from 1 to 2000 V, particularly preferably in a range of from 30 to 1900 V, more particularly preferably in a range of from 50-1600 V, more preferably in a range of from 100-1500 V and further preferably 150-1400 V.

The generally porous electrode bodies used preferably have a porosity of 10 to 90%, preferably of 30 to 80%, particularly preferably of 50 to 80%, and an average pore diameter of from 10 to 10000 nm, preferably from 50 to 5000 nm, particularly preferably from 100 to 3000 nm.

According to a first special embodiment of the method according to the invention, the electrolytic capacitor to be manufactured is an aluminium wound capacitor. In this case, in method step a), a porous aluminium film as electrode material is formed anodically, whereby an aluminium-oxide coating is formed as the dielectric. The aluminium film (anode film) thus obtained is then provided with a contact wire and wound up with a further porous aluminium film (cathode film) also provided with a contact wire, whereby these two films are separated from one another by one or more separator papers, which are based, for example, on cellulose or preferably on synthetic papers. After the winding, the anode bodies obtained in this manner are fixed, for example, by means of an adhesive tape. The separator paper or papers can be carbonised by heating in an oven. This manner of manufacturing anode bodies for aluminium wound capacitors is sufficiently known from the prior art and is described, for example in U.S. Pat. No. 7,497,879 B2.

In method step b) of the method according to the invention, a dispersion, which contains particles of an electrically conductive polymer and a dispersion medium, is then introduced into the porous region of the anode body. The dispersions are introduced into the porous region using known methods, for example, immersion, dipping, pouring, dripping, injection, spraying, spreading, painting or printing, for example, ink-jet, screen printing or tampon printing.

The introduction is preferably carried out in that the anode body prepared in method step a) is immersed in the dispersion and is accordingly impregnated with this dispersion. The immersion into or the impregnation with the dispersion is preferably implemented for a duration in a range of from 1 second to 120 min, particularly preferably in a range of from 10 seconds to 60 min and most preferably in a range of from 30 seconds to 15 min. The introduction of the dispersion into the anode body can be facilitated, for example, by increased or reduced pressure, vibration, ultrasound or heat.

The introduction of the dispersion into the anode body can occur directly or using an adhesion promoter, for example, a silane, such as organofunetional silanes or their hydrolysates, for example, 3-glycidoxypropyltrialkoxysilane, 3-aminopropyltriethoxysilane, 3-mercaptopropyltrimethoxysilane, 3-methacryloxypropyltrimethoxysilane, vinyltrimethoxysilane or octyltriethoxysilane, and/or one or more other functional layers.

By means of the introduction it is preferably achieved that the dispersion tends to a lesser extent to cover over the pores of the porous region with a layer. Rather, the surfaces of the cavities of the pores are at least partially coated with the dispersion. In this manner, the particles present in the dispersion not only form a layer covering the openings of the pores; at least parts, often also all regions of the surface of the pores are covered with a layer of particles of the dispersion.

The term "polymers", as it is used within the scope of the present invention, includes within the sense of the invention all compounds with more than one identical or different repeating unit.

The term "conductive polymers" refers here in particular to the compound class of conjugated polymers, which have an electrical conductivity after oxidation or reduction. Preferably such □-conjugated polymers, which, after oxidation have an electrical conductivity in the order of magnitude of at least $0.1$ $S$ $cm^{-1}$ are understood as conductive polymers.

The particles of the electrically conductive polymer in the dispersion preferably contain at least one polythiophene, polypyrrole or polyaniline, which are optionally substituted.

Particularly preferably, the particles of the electrically conductive polymer comprise at least one polythiophene with repeating units selected from the group consisting of the general formula (I), the general formula (II) or the general formula (III) or a combination of at least two thereof. In the following possible variants, the particles of the electrically conductive polymer in the dispersion comprise at least one polythiophene with repeating units of the general formula (I) or of the general formula (II) or of the general formula (III) or repeating units of the formulas (I) and (II) or repeating units of the formulas (I) and (III) or repeating units of the formulas (II) and (III) or repeating units of the formulas (I), (II) and (III), (I)

(II)

(III)

wherein
  A denotes an optionally substituted $C_1$-$C_5$-alkylene residue,
  R denotes a linear or branched, optionally substituted $C_1$-$C_{18}$-alkyl residue, an optionally substituted $C_5$-$C_{12}$-cycloalkyl residue, an optionally substituted $C_6$-$C_{14}$-aryl residue, an optionally substituted $C_7$-$C_{18}$-aralkyl residue, an optionally substituted $C_1$-$C_4$-hydroxyalkyl residue or a hydroxyl residue,
  x denotes an integer from 0 to 8 and,
  in the case that several residues R are bound to A, these can be identical or different.

The general formulas (I) and (II) should be understood such that x substituents R can be bound to the alkylene residue.

Polythiophenes with repeating units of the general formula (I) or (II) or repeating units of the general formula (I) and (II), wherein A denotes an optionally substituted $C_2$-$C_3$-alkylene residue and x denotes 0 or 1 are particularly preferred.

Poly(3,4-ethylenedioxythiophene), which is optionally substituted, is quite particularly preferred as a conductive polymer of the solid electrolyte.

Within the framework of the invention, the prefix poly- is understood to mean that more than one identical or different repeating unit is contained in the polymer or polythiophene. The polythiophenes comprise in total n repeating units of the general formula (I) or of the general formula (II) or of the general formula (III) or of the general formulas (I) and (II) or of the general formulas (I) and (III) or of the general formulas (II) and (III) or of the general formulas (I), (II) and (III), wherein n is an integer from 2 to 2000, preferably 2 to 100. The repeating units of the general formula (I) or of the general formula (II) or of the general formula (III) or the repeating units of the general formulas (I) and (II) or the repeating units of the general formulas (I) and (III) or the repeating units of the general formulas (II) and (III) or the repeating units of the general formulas (I), (II) and (III) can be respectively identical or different in each case within one polythiophene. Polythiophenes with respectively identical repeating units of the general formula (I) or of the general formula (II) or of the general formula (III) or with respectively identical repeating units of the general formulas (I) and (II), or of the general formulas (I) and (III), or of the general formulas (II) and (III), or with respectively identical repeating units of the general formulas (I), (II) and (III) are preferred. Polythiophenes with respectively identical repeating units of the general formula (I) or of the general formula (II) or with respectively identical repeating units of the general formulas (I) and (II) are particularly preferred.

The polythiophenes preferably carry H in each terminal group.

Within the scope of the invention, $C_1$-$C_5$-alkylene residues A are preferably methylene, ethylene, n-propylene, n-butylene or n-pentylene. $C_1$-$C_{18}$-alkyl R preferably denote linear or branched $C_1$-$C_{18}$-alkyl residues such as methyl, ethyl, n-oder iso-propyl, n-, iso-, sec- or tertbutyl, n-pentyl, 1-methylbutyl, 2-methylbutyl, 3-methylbutyl, 1-ethylpropyl, 1,1-dimethylpropyl, 1,2-dimethylpropyl, 2,2-dimethylpropyl, n-hexyl, n-heptyl, n-octyl, 2-ethylhexyl, n-nonyl, n-decyl, n-undecyl, n-dodecyl, n-tridecyl, n-tetradecyl, n-hexadecyl or n-octadecyl, $C_5$-$C_{12}$-cycloalkyl residues R denote, for example, cyclopentyl, cyclohexyl, cycloheptyl, cyclooctyl, cyclononyl or cyclodecyl, $C_5$-$C_{14}$-aryl residues R denote, for example, phenyl or naphthyl, and $C_7$-$C_{18}$-aralkyl residues R, for example, benzyl, o-, m-, p-tolyl, 2,3-, 2,4-, 2,5-, 2,6-, 3,4-, 3,5-xylyl or mesityl. The above list is provided for the purpose of exemplary explanation of the invention and should not be regarded as exclusive.

As optional further substituents for the residues A and/or the residues R, numerous organic groups come under consideration within the scope of the invention, for example, alkyl-, cycloalkyl-, aryl-, aralkyl-, alkoxy, halogen-, ether-, thioether-, disulfide-, sulfoxide-, sulfon-, sulfonate-, amino-, aldehyde-, keto-, carboxylic ester-, carboxylic acid-, carbonate-, carboxylate-, cyano-, alkylsilane- and alkoxysilane groups and carboxylamide groups.

The residues A and R listed above and/or the further substituents of the residues A and R, for example, come into consideration as substituents for polyaniline or polypyrrole. Unsubstituted polyanilines are preferred.

The scope of the invention includes all of the general residue definitions, parameters and explanations presented above and listed below or named in the preferred ranges, together with one another, that is to say, in any combination between the respective ranges and preferred ranges.

The polythiophenes used in the preferred method as a solid electrolyte can be neutral or cationic. In preferred embodiments, they are cationic, wherein "cationic" relates only to the charges provided on the main polythiophene chain. Dependent upon the substituent on the residues, the polythiophenes can carry positive and negative charges within the structural unit, whereby the positive charges are disposed on the main polythiophene chain and the negative charges optionally on the residues R substituted by sulfonate or carboxylate groups. Accordingly, the positive charges of the polythiophene main chain can be compensated in part or completely by the anionic groups optionally present on the residues R. In general, in these cases, the polythiophenes can be cationic, neutral or even anionic. However, within the scope of the invention they are all regarded as cationic polythiophenes, because the positive charges on the main polythiophene chain are of decisive importance. The positive charges are not shown in the formulas, because their precise number and position cannot be accurately determined. The number of positive charges, however, is at least 1 and at most n, wherein n denotes the total number of all repeating units (identical or different) within the polythiophene.

For the compensation of the positive charge, provided this does not already take place through the optionally sulphonate-substituted or carboxylate-substituted and therefore negatively charged residues R, the cationic polythiophenes require anions as counterions.

The counterions can be monomeric or polymeric anions, the latter are also referred to below as polyanions.

Polymeric anions are preferred by comparison with monomeric anions, because they contribute to the formation of the film and, because of their size, lead to thermally more stable electrically conductive films.

Polymeric anions here can be, for example, anions of polymeric carboxylic acids, such as polyacrylic acids, polymethacrylic acid or polymaleic acids, or polymeric sulfonic acids, such as polystyrene sulfonic acids and polyvinyl sulfonic acids. These polycarboxylic and polysulfonic acids can also be copolymers of vinylcarboxylic and vinylsulfonic acid with other polymerisable monomers, such as acrylic esters and styrene.

An anion of a polymeric carboxylic acid or sulfonic acid in the particles mentioned is preferred as a polymeric anion.

The anion of polystyrene sulfonic acid (PSS), which is present with the use of polythiophene, especially of poly(3, 4-ethylenedioxythiophene), preferably complex-bound in the form of the PEDOT/PSS complexes known from the prior art, is particularly preferred as the polymeric anion. Such complexes can be obtained through oxidative polymerisation of the thiophene monomers, preferably 3,4-ethylenedioxythiophene, in aqueous solution in the presence of polystyrene sulfonic acid.

The molecular weight of the poly-acids providing the polyanions is preferably 1000 to 2 000 000, by particular preference 2000 to 500 000. The poly-acids or their alkaline salts are commercially available, for example, polystyrene sulfonic acids and polyacrylic acids, but can also be manufactured using known methods (see, for example, Houben Wcyl, Methoden der organischen Chemie, Vol. E 20 Makromolekulare Stoffe, Part 2, (1987), [Methods of Organic Chemistry, Macromolecular Substances] pages 1141 et seq.).

The polymer anion(s) and electrically conductive polymers can be contained in the dispersion, especially in a weight ratio of 0.5:1 to 50:1, preferably of 1:1 to 30:1, particularly preferably 2:1 to 20:1. The weight of the electrically conductive polymers in this context corresponds to the weighed amount of the monomers used, on the assumption that a complete conversion takes place during the polymerisation.

As monomeric anions, for example, those of $C_1$-$C_{20}$-alkane sulfonic acids, such as methane-, ethane-, propane-, butane- or higher sulfonic acids such as dodecanic sulfonic acid, aliphatic perfluorosulfonic acids, such as trifluoromethane sulfonic acid, perfluorobutane sulfonic acid or perfluoroctane sulfonic acid, aliphatic $C_1$-$C_{20}$-carboxylic acids, such as 2-ethylhexyl carboxylic acid, aliphatic perfluorocarboxylic acids, such as trifluoroacetic acid or perfluoroctane acid, and aromatic sulfonic acids, optionally substituted with $C_1$-$C_{20}$-alkyl groups, such as benzene sulfonic acid, o-toluene sulfonic acid, p-toluene sulfonic acid or dodecylbenzenesulfonic acid and cycloalkane sulfonic acids such as camphor sulfonic acid or tetrafluoroborates, hexafluorophosphates, perchlorates, hexafluoroantimonates, hexafluoroarsenates or hexachloroantimonates, can be used.

The anions of p-toluene sulfonic acid, methane sulfonic acid or camphor sulfonic acid are preferred as monomeric anions.

Cationic polythiophenes, which contain anions as counterions for charge compensation, are often referred to in the specialist world as polythiophene/(poly)-anion-complexes.

The particles, especially the particles of the conductive polymer of the dispersion have a specific electrical conductivity of greater than 100 S/cm. The specific electrical conductivity of the particles in this context is the specific electrical conductivity of the film in the dry state, which forms from the particles upon drying of the dispersion. Preferably, dispersions are used, of which the particles have a specific electrical conductivity of greater than 150 S/cm, particularly preferably greater than 250 S/cm, more particularly preferably greater than 400 S/cm, further particularly preferably greater than 750 S/cm. In some cases, particles with a maximum specific conductivity of 5000 S/cm are also used.

According to the invention, the particles, especially the particles of the conductive polymer in the dispersion, have a diameter $d_{50}$ in a range of from 1 to 70 nm, preferably in a range of from 1 to below 40 nm, preferably in a range of from 1 to 35 nm, particularly preferably in a range from 1 to 30 nm and more particularly preferably in a range of from 5 to 25 nm. The determination of the diameter of the particles is carried out via ultra-centrifuge measurement according to the method described here.

The particles of the conductive polymer in the dispersion according to the invention preferably have a $d_{90}$ value of the diameter distribution of less than 100 nm, particularly preferably less than 70 nm, more particularly preferably less than 50 nm.

The particles of the conductive polymer in the dispersion according to the invention preferably have a $d_{10}$ value of the diameter distribution greater than 1 nm, particularly preferably greater than 3 nm, more particularly preferably greater than 5 nm.

The dispersion preferably comprises a purity with regard to metals and transition metals as described in WO2010/003874A2, published document on page 6, lines 10-29. The low concentrations of metals in the dispersions have the major advantage that the dielectric is not damaged during the formation of the solid electrolyte and during the subsequent operation of the capacitor.

The dispersions comprise one or more dispersing agents, wherein water, organic solvents or mixtures of organic solvents and water are preferred as the dispersing agent. The following solvents can be named as examples of dispersing agents: aliphatic alcohols such as methanol, ethanol, i-propanol and butanol; aliphatic ketones such as acetone and methylethylketone; aliphatic carboxylic esters such as acetic acid ethylester and acetic acid butyl ester; aromatic hydrocarbons such as toluene and xylene; aliphatic hydrocarbons such as hexane, heptane and cyclohexane; chlorinated hydrocarbons such as dichloromethane and dichloroethane; aliphatic nitriles such as acetonitrile, aliphatic sulfoxides and sulfones such as dimethylsulfoxide and sulfolane; aliphatic carboxylic acid amides such as methylacetamide, dimethylacetamide and dimethylformamide; aliphatic and araliphatic ethers such as diethylether and anisole. Moreover, water or a mixture of water with the above named organic solvents can also be used as a dispersing agent.

Preferred dispersing agents are water or other protic solvents such as alcohols, for example, methanol, ethanol, i-propanol and butanol, and mixtures of water with these alcohols; the particularly preferred dispersing agent is water.

Moreover, the dispersion comprising conductive polymers can comprise further components such as surface-active substances, for example, ionic and non-ionic surfactants or adhesion promoters, such as organo-functional silanes or their hydrolysates, for example, 3-glycidoxypropyltrialkoxysilane, 3-aminopropyltriethoxysilane, 3-mercaptopropyltrimethoxysilane, 3-methacryloxypropyltrimethoxysilane, vinyltrimethoxysilane or octyltriethoxysilane, crosslinking agents such as melamine compounds, blocked isocyanates, functional silanes—for example, tetraethoxysilane, alkoxysilane hydrolysates, for example, based on tetraethoxysilane, epoxysilanes, such as 3-glycidoxypropyltrialkoxysilane-polyurethanes, polyacrylates or polyolefine dispersions.

Preferably, the dispersions comprising conductive polymers comprise further additives, which increase the conductivity, such as, ether-group-comprising compounds, such as for example tetrahydrofuran, lactone-group-comprising compounds, such as γ-butyrolactone, γ-valerolactone, amide- or lactam-group-comprising compounds such as caprolactam, N-methylcaprolactam, N,N-dimethylacetamide, N-methylacetamide, N,N-dimethylformamide (DMF), N-methylformamide, N-methylformanilide, N-methylpyrrolidone (NMP), N-octylpyrrolidone, pyrrolidone, sulfones and sulfoxides, such as sulfolane (tetramethylensulfone), dimethylsulfoxide (DMSO), sugars or sugar derivatives, such as saccharose, glucose, fructose, lactose, sugar alcohols, such as, sorbitol, mannitol, furane derivatives, such as 2-furane carboxylic acid, 3-furane carboxylic acid, and/or di- or polyalcohols, such as ethylene glycol, glycerine, di- or triethylene glycol. Tetrahydrofuran, N-methylformamide, N-methylpyrrolidone, ethylene glycol, dimethylsulfoxide or sorbitol are used particularly preferably as conductivity-increasing additives.

The dispersions comprising conductive polymers preferably have a content of impregnating agent of less than 2.5% by weight, by particular preference of less than 1% by weight, by quite particular preference of less than 0.1% by weight, in each case relative to the total weight of the dispersion. More preferably the dispersions comprise no impregnating agent and in particular no polyalkylene glycol or polyalkylene glycol derivatives. Polyalkylene glycol or polyalkylene glycol derivatives in the dispersion easily lead to an undesirable decrease of the capacitance at low temperatures.

The dispersions comprising conductive polymers can also comprise one or more organic binding agents soluble in organic solvents as described in WO2009/141209A1 on page 12, lines 16-34. The dispersions can have a pH value from 1 to 14, a pH value from 1 to 8 is preferred. For corrosion-sensitive dielectrics, such as aluminium oxides or niobium oxides, dispersions with a pH value from 2.5 to 8 are preferred, in order to avoid damaging the dielectric.

In order to adjust the pH value, the bases or acids described in WO2010/003874A2 on page 4, lines 13-32, for example, can be added to the dispersions comprising conductive polymers. Such additives, which do not impair the film formation of the dispersions and are not volatile at relatively high temperatures, for example, at soldering temperatures, but remain within the solid electrolyte under these conditions, such as the bases 2-dimethylaminoethanol, 2,2'-iminodiethanol or 2,2',2"-nitrilotriethanol and the acid polystyrene sulfonic acid, are preferred.

The viscosity of the dispersions comprising conductive polymers can, dependent upon the method of application, be between 0.1 and 1000 mPa·s (measured with a rheometer at 20° C. and a shear rate of 100 s$^{-1}$). Preferably, the viscosity is 1 to 500 mPa·s, particularly preferably between 10 to 200 mPa·s, more particularly preferably 40 to 150 mPa·s.

The solids content of the dispersion comprising conductive polymers used in method step b) preferably lies in a range of from 0.1 to 20% by weight, particularly preferably in a range of from 0.5 to 10% by weight and most particularly preferably in a range of from 1 to 5% by weight, in each case based on the total weight of the dispersion comprising conductive polymers. The solids content is determined by drying the dispersion at a temperature which is sufficiently high to remove the dispersing agent, but which does not break down the solid material.

As precursors for the manufacture of conductive polythiophenes of the particles in the dispersion, corresponding monomers or their derivatives are understood as described in WO2010/003874A2 on page 17, line 29 to page 20, line 24.

The particle size of the particles in the dispersion can be reduced, for example, by means of a high-pressure homogeniser. This process can also be repeated in order to increase the effect. In particular, pressures between 100 and 2000 bar have proved advantageous in order to reduce the particle size markedly. The manufacture of a polythiophene/polyanion complex and subsequent dispersion or re-dispersion in one or more solvent(s) is also possible.

After the anode bodies have been impregnated with the dispersion described above, in method step c) the dispersing agent comprised in the dispersion is at least partially removed or cured, so that a solid electrolyte is formed, which covers the dielectric partially or completely. In this context, it is preferable that the covering of the dielectric by the solid electrolyte preferably amounts to at least 50%, particularly preferably at least 70% and most preferably at least 80%, wherein the measurement of the capacitance of the capacitor in a dry and wet condition at 120° C. allows a determination as described in DE-A-10 2005 043 828.

The removal or curing is preferably carried out in that the electrode body is removed from the dispersion and dried, wherein the drying preferably takes place at a temperature in a range from 20° C. to 200° C., particularly preferably in a range from 50° C. to 175° C. and more preferably in a range from 80° C. to 150° C. The method steps b) and c) can also be repeated once or several times in order to adapt the thickness of the layer of the solid electrolyte deposited on the dielectric or the filled level of the solid electrolyte in the electrode body to the respective requirements.

In method step d) of the method according to the invention, polyalkylene glycol or a polyalkylene glycol derivative is introduced into the capacitor body obtained in method step c), wherein it is preferred that the polyalkylene glycol or the polyalkylene glycol derivative is introduced in the form of a solution comprising a solvent and the polyalkylene glycol or the polyalkylene glycol derivative and, in a further method step e), the solvent is at least partially removed from the solution introduced into the capacitor body, preferably to more than 50% by weight, particularly preferably to more than 90% by weight and more particularly preferably to more than 98% by weight. Preferably, the impregnating agents used according to the invention provide at least 2, preferably at least 3 and particularly preferably at least 5 and more preferably at least 7 repeating units in one molecule. In some cases, impregnating agent with up to 1000, preferably up to 300 repeating units in one molecule are suitable.

Preferred impregnating agents are polyalkylene glycols, especially on the basis of ethylene and propylene glycols and statistical co-polymers of both, with a molecular weight between 100 and 100 000. The polyalkylene glycols can also be branched.

The polyalkylene glycols can be un-substituted in the terminal groups, that is, they can early two free hydroxyl groups, or can be singly or doubly functionalised in the terminal groups.

Appropriate functionalities are ether groups, for example, substituted or un-substituted alkyl ethers, substituted or un-substituted allyl ethers, substituted or un-substituted vinyl ethers, glycidylethers, substituted or un-substituted aryl ethers etc. Examples are, inter alia, polyethylene glycol monomethylether, polypropylene glycol monomethylether, polyethylene glycol monoethylether, polypropylene glycol monoethylether, polyethylene glycol monobutylether, polypropylene glycol monobutylether, polyethylene glycol monoallylether, polypropylene glycol monoallylether, polyethylene glycol monovinylether, polypropylene glycol monovinylether, polyethylene glycol monophenylether, polypropylene glycol monophenylether. Examples of polyalkylene glycol diethers are, inter alia, polyethylene glycol dimethylether, polypropylene glycol dimethylether, polyethylene glycol diethylether, polypropylene glycol diethylether, polyethylene glycol dibutylether, polypropylene glycol dibutylether, polyethylene glycol diallylether, polypropylene glycol diallylether, polyethylene glycol divinylether, polypropylene glycol divinylether, polyethylene glycol diphenylether, polypropylene glycol diphenylether.

Other appropriate functionalities are ester groups, wherein the polyalkylene glycols can be esterified either singly or doubly with carboxylic acids. Appropriate examples are polyalkylene glycols, which are esterified singly or doubly with formic acid, acetic acid, propionic acid, butyric acid, benzoic acid, acrylic acid etc.

Polyalkylene glycol esters and other acids such as organic sulfonic acids, for example, tolu ene sulfonic acid, naphthalene sulfonic acid etc. phosphoric and phosphonic acids are also suitable.

The polyalkylene glycols can also be substituted differently, that is, they can carry two different substituents of those described above in the terminal groups.

The polyalkylene glycol or the polyalkylene glycol derivative is introduced into the capacitor body according to known methods such as immersion, dipping, pouring, dripping, injection, spraying, spreading, painting or printing, for example, inkjet, screen printing or tampon printing. Preferably the introduction is performed in that the capacitor body prepared in method step c) is immersed in a solution comprising the polyalkylene glycol or the polyalkylene glycol derivative and is accordingly impregnated with the polyalkylene glycol or the polyalkylene glycol derivative. The immersion in or respectively the impregnation with the solution is preferably implemented for a duration in a range of from 1 second to 120 min, particularly preferably in a range of from 10 seconds to 60 min and most preferably in a range of from 30 seconds to 15 min. The introduction of the solution comprising the polyalkylene glycol or the polyalkylene glycol derivative into the capacitor body can be facilitated, for example, by increased or reduced pressure, vibration, ultrasound or heat.

All solvents known to the person skilled in the art, in which polyalkylene glycols or polyalkylene glycol derivatives, especially polyethylene glycols can be dissolved or dispersed and with which the capacitor body can be impregnated, can be used as solvents. Particularly preferred according to the invention is the use of water or an alcohol or a mixture thereof as the solvent.

The polyalkylene glycol or polyalkylene glycol derivative preferably has a molecular weight determined by gel permeation chromatography in a range of from 100 to 100,000 g/mol, particularly preferably in a range of from 200 to 50,000 g/mol and most preferably in a range of from 200 to 5000. As polyalkylene glycols, especially polyethylene glycols or polypropylene glycols come under consideration, wherein polyethylene glycols are quite particularly preferred according to the invention. In particular, the polyethylene glycols referred to by the designations "PEG 300", "PEG 400", "PEG 1000", "PEG 2000" or "PEG 4000" come under consideration. PEG 400 is particularly preferred.

The concentration of polyalkylene glycol or of polyalkylene glycol derivative in the solution is often disposed in a range of from 1 to 99% by weight, preferably in a range of from 5 to 95% by weight, particularly preferably in a range of from 10 to 80% by weight and more particularly preferably in a range of from 25 to 60% by weight, in each case based on the total weight of the solution.

The solution of the polyalkylene glycol or polyalkylene glycol derivative preferably comprises less than 2% by weight of a conductive polymer based on the weight of the solution, particularly preferably less than 1% by weight, more particularly preferably less than 0.5% by weight and yet more particularly preferably less than 0.1% by weight. The same preferred ranges apply for the conductive polymers here as listed above.

In a further embodiment of the method according to the invention, it is preferred that in method step d), a stabiliser is used alongside the impregnating agent. The stabiliser can be used in any manner and at any time known to the person skilled in the art which seems appropriate. Accordingly, the stabiliser can be used before, with and after the impregnating agent, wherein each of these variants represents an embodiment of the method according to the invention. In the method according to the invention, it is preferred that, in method step d), the introduction of the impregnating agent occurs in the presence of a stabiliser. All organic compounds different from the impregnating agent which seem suitable for this purpose to the person skilled in the art can be considered as stabilisers, wherein aromatic compounds comprising OH groups, aromatic compounds comprising OH and another heteroatomic functional group different from carbon or a combination of at least two thereof are preferred. Accordingly, ester groups can be named by way of example as the heteroatomic functional group. Particularly preferred as the stabiliser are the organic compounds listed below on their own or in a combination of two or more.

The first to be listed are hydroxybenzenes and hydroxynaphthalenes and their derivatives, especially 1,3-dihydroxybenzene, 1,4-dihydroxybenzene, 2,3-dihydroxybenzene, dihydroxyalkylbenzenes, dihydroxynaphthalene, trihydroxybenzene (pyrogallol).

Furthermore, 3,4,5-trihydroxybenzoic esters (gallic esters), especially -alkylesters, alkenylesters, -cycloalkylesters, -cycloalkenylesters, -arylesters, in each case with preferably 1 to 15 C-atoms in the aryl- or alkyl groups of the esters, should be mentioned.

As aromatic compounds comprising OH— and a further heteroatomic functional group, esters of gallic acid esterified with sugars, which are often referred to as tannin or gallotannins (cf. Römpp Chemie, 10th edition (1999), page 4391) should be named, wherein the heteroatomic functional group here is an ester group.

In a further embodiment, the one further heteroatomic functional group is an ester group, a carboxy- group, an amide group. Preferred examples are dihydroxyacetophenones, dihydroxybenzophenones, dihydroxydiphenylsulfones, tetrahydroxydiphenylsulfones, tetramethyldihydroxydiphenylsulfones, hydroxyquinone carboxylic acid and salts, hydro dihydroxynaphthalene dicarboxylic acid, dihydroxynaphthalene carboxylic acid and salts, phenyldihydroxynaphthalene carboxylic acid, dihydroxynaphthalene disulfonic acid and salts, quinone sulfonic acid and salts, dihydroxybenzene disulfonic acid and salts, trihydroxyacetophenone, trihydroxybenzophenone, trihydroxybenzaldehyde, trihydroxyanthraquinones, tetrahydroxybenzoquinone, tetrahydroxyanthraquinone, polyhydroxybenzoic acids, especially dihydroxybenzoic acid, dihydroxybenzoic ester (methyl-, ethyl-, propylester), trihydroxybenzoic acid, trihydroxybenzoic ester (methyl-, ethyl-, propylester). Particularly preferred stabilisers are the above named compounds which carry a sulfonic acid or carboxy- group.

Compounds comprising an additional amide group can be hydroxybenzoic acid amides, such as 2,4-dihydroxybenzoic acid vanillylamide, 2,4-dihydroxybenzoic acid-N-(4-hydroxy-3-methoxybenzyl)amide, 2,4,6-trihydroxybenzoic acid-N-(4-hydroxy-3-methoxybenzyl)amide, 2-hydroxybenzoic acid-N-4-(hydroxy-3-methoxybenzyl)amide, 4-hydroxybenzoic acid-N-(4-hydroxy-3-methoxybenzyl)amide, 2,4-dihydroxybenzoic acid-N-(4-hydroxy-3-methoxybenzyl)amide-mono-sodium salt, 2,4-di hydroxybenzoic acid-N-2-(4-hydroxy-3-methoxyphenyl)ethylamide, 2,4-dihydroxybenzoic acid-N-(4-hydroxy-3-ethoxybenzyl)amide, 2,4-dihydroxybenzoic acid-N-(3,4-dihydroxybenzyl)amide and 2-hydroxy-5-methoxy-N-[2-(4-hydroxy-3-methoxyphenyl)ethyl]amide; 4-hydroxybenzoic acid vanillylamide.

Alongside the above named compound groups and individual compounds, the following compounds can be used as stabilisers in combination with one another, with the above compounds or also on their own: polymers of trimethyldihydroquinoline, diphenylamines, phenothiazines, phenyl-alpha naphthylamine, 4,4' methylene-bis-2,6-di-tert-butylphenol, hydroxyanisole butylate, hydroxytoluene butylate, methoxyphenol (hydroxyanisole), ascorbic acid, tert-butylhydroquinone, flavonoids (e.g. quercetin) or a combination of at least two thereof.

Furthermore, it is preferable to use the stabiliser or stabilisers in a concentration in a range of from 0.01 to 60% by weight, preferably in a range of from 0.1% by weight to 50% by weight, particularly preferably in a range of from 0.5% by weight to 20% by weight and particularly preferably in a range of from 1% by weight to 5% by weight, in each case based on the total weight of the impregnation solution comprising the impregnating agent and stabiliser.

Provided a solution comprising a solvent and the polyalkylene glycol or polyalkylene glycol derivative is used in method step d), and the solvent is at least partially removed in method step e) from the solution introduced into the capacitor body, it is preferred that this removal is preferably implemented in that the capacitor body is taken out of the solution and dried. The drying is preferably implemented at a temperature in a range of from 20° C. to 200° C., particularly preferably in a range of from 50° C. to 175° C. and more particularly preferably in a range of from 75° C. to 150° C. and for a duration in a range of from 1 minute to 120 minutes, particularly preferably in a range of from 5 minutes to 90 minutes and most particularly preferably in a range of from 10 minutes to 60 minutes.

Before the drying, it can prove advantageous in this method step to rinse the capacitor body with fluid, for example, with water, in order to remove solution with the polyalkylene glycol or polyalkylene glycol derivative adhering to the outer surfaces of the capacitor body.

After the polyalkylene glycol or the polyalkylene glycol derivative has been introduced into the capacitor body in this manner, the electrolytic capacitors can be finished in a manner known to the person skilled in the art. In the case of a tantalum electrolytic capacitor, the capacitor body can be coated, for example, with a graphite layer and a silver layer, as known from DE-A-10 2005 043 828, while in the case of an aluminium wound capacitor corresponding to the teaching of U.S. Pat. No. 7,497,879B2, the capacitor body is built into an aluminium cup, provided with a sealing disc and firmly closed in a mechanical manner by flanging. Following this, defects in the dielectric can be removed from the capacitor in a per se known manner by "ageing".

The capacitors according to the invention often provide a particularly thick dielectric layer generally formed as an oxide layer. In many cases, the layer thickness is 30 nm and more, preferably 50 nm and more and by particular preference 100 nm and more. In some cases, the layer thickness is a maximum of 5000 nm. By preference, oxide-film thicknesses for capacitors of which the electrode material is based on aluminium are, for example, greater than 30 nm, particularly preferably greater than 50 nm, more particularly preferably greater than 100 nm, most particularly preferably greater than 150 nm. For example, oxide-film thicknesses for capacitors of which the electrode material is based on tantalum are preferably greater than 50 nm, particularly preferably greater than 80 nm, more particularly preferably greater than 150 nm, most particularly preferably greater than 250 nm. For example, oxide-film thicknesses for capacitors of which the electrode material is based on niobium or niobium oxide are preferably greater than 80 nm, particularly preferably greater than 130 nm, more particularly preferably greater than 250 nm, most particularly preferably greater than 400 nm. Further details of the dielectric layers are provided in WO 2007/031207, page 13, line 9 to page 14, line 16.

A contribution towards the solution of the objects named in the introduction is also achieved by a capacitor which has been manufactured through the method according to the invention, wherein this capacitor is preferably an electrolytic capacitor, by particular preference the aluminium wound capacitor described above.

In this context, it is preferred that the capacitor obtainable through the method according to the invention has the following properties, particularly if it is an aluminium capacitor, preferably an aluminium wound capacitor:

($\alpha$1)) a decrease of the capacitance of at most 20%, particularly preferably of at most 15% and most preferably of at most 10%, on reducing the temperature from 20° C. to −45° C. and ($\alpha$2) a breakdown voltage of at least 50 V, preferably at least 100 V and particularly preferably at least 140 V.

A further contribution to the solution of at least one of the objects named in the introduction is achieved by a capacitor comprising the following as components:

i. a preferably porous electrode body made of an electrode material, wherein a dielectric at least partially covers the surface of this electrode material and forms an anode body, ii. wherein the anode body is at least partially coated with a solid electrolyte and forms a capacitor body, iii. wherein the capacitor body comprises an organic impregnating agent, wherein the capacitor has the following properties:

($\alpha$1)) a decrease of the capacitance of at most 20%, particularly preferably of at most 15% and most preferably of at most 10%, on reducing the temperature from 20° C. to −45° C.; and ($\alpha$2) a breakdown voltage of at least 50 V, preferably at least 100 V and particularly preferably at least 140 V;

wherein the organic impregnating agent has a melting point of less than 150° C., preferably less than 100° C., preferably less than 75° C. and particularly preferably less than 50° C. and has no boiling point.

With regard to the components of the capacitor, reference is made to the details given in the present text. The preferred embodiments also apply for the components. In particular, polymers which are preferably free from silicon-carrying repeating units come into consideration as the organic impregnating agent. In general, these polymers have at least 3 repeating units. In addition to the organic impregnating agent, polyalkylene glycol or a polyalkylene glycol derivative or a combination thereof, the stabilisers described here should also be mentioned as an embodiment according to the invention, especially if these correspond to the other features of the organic impregnating agent. Particularly preferred organic impregnating agents are polyalkylene glycol or a polyalkylene glycol derivative or a combination thereof, wherein polyalkylene glycol is preferred as an organic impregnating agent and polyethylene glycol or polypropylene glycol or their mixtures are particularly preferred.

A contribution towards the solution of the objects named in the introduction is also made by the use of the capacitors obtainable through the method according to the invention in electronic circuits, for example, as smoothing capacitors ("filter capacitors") or suppression capacitors ("decoupling capacitors"). Electronic circuits, as found, for example, in computers (desktop, laptop, server), in computer peripheral devices (for example PC cards), in portable electronic devices, such as mobile telephones, digital cameras or consumer electronics, in consumer electronics equipment, such as in CD/DVD players and computer-game consoles, in navigation systems, in telecommunications devices, in household equipment, in medical technology, for example, for defibrillators, in power supplies such as those based on renewable energy or in automobile electronics, for example, for hybrid or electric cars.

Moreover, a contribution to the solution of the objects named in the introduction is provided by electronic circuits comprising a capacitor obtainable through the method according to the invention.

The invention is now explained in greater detail with reference to non-limiting drawings and examples.

Figure 1:
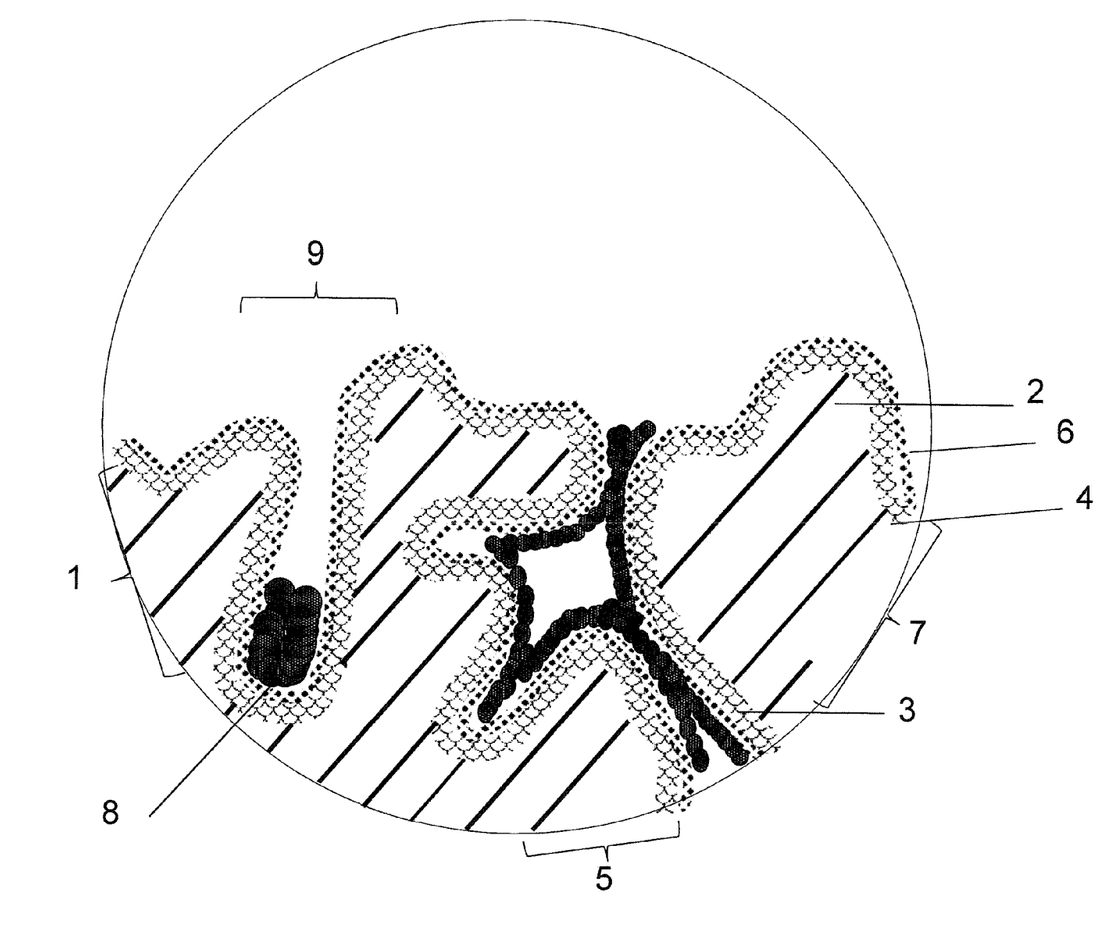
FIG. 1 shows a schematic sectional view through a part of a capacitor according to the invention.

FIG. 1 shows a schematic sectional view through a part of a capacitor according to the invention. The latter has an electrode body 1, made mostly from a porous electrode material 2 such as aluminium. On the surface 4 of the electrode material 2, a dielectric 3 is formed as a thin layer, so that an anode body 5 is formed which is still porous, comprising the electrode body 1 made of the electrode material 2 and the dielectric 3. On the dielectric 3, there follows, optionally after further layers, a layer of a solid electrolyte 6 (for example, made of PEDOT/PSS particles), so that a capacitor body 7 is formed, comprising the electrode body 1 made of the electrode material 2, the dielectric 3 and the solid electrolyte 6. On the solid electrolyte 6, there follows a layer of an impregnating agent 8 (for example, polyethylene glycol), so that a capacitor is formed, comprising the electrode body 1 made of the electrode material 2, the dielectric 3, the solid electrolyte 6 and the impregnating agent 8. The impregnating agent 8 is introduced into the capacitor body 7, for example, in such a manner that it completely or partially fills the pores 9.

Measurement Methods:

Determination of Particle Size:

The average particle size of the dispersions was determined by means of ultra-centrifuge. The measurement method and precise implementation is described by W. Scholtan and H. Lange in Kolloid—Z. u. Z. Polymere 250, 782-796 (1972). By way of deviation from the latter, the polymer dispersions were diluted before the measurement with pure water to a measurement extinction of 1.

In the case of particles which swell in the dispersion, the particle size is measured in the swollen state. A diameter distribution of the particles relates to a mass distribution of the particles in the dispersion dependent upon the particle diameter. The $d_{10}$ value of the diameter distribution then indicates that 10% of the total mass of all particles of the conductive polymer in the dispersion can be allocated to those particles which have a diameter smaller than or equal to the $d_{10}$ value. The $d_{50}$ value indicates that 50% of the total mass of all particles of the conductive polymer in the dispersion can be allocated to those particles which have a diameter smaller than or equal to the $d_{50}$ value. The $d_{90}$ of the diameter distribution indicates that 90% of the total mass of all particles of the conductive polymer in the dispersion can be allocated to those particles which have a diameter smaller than or equal to the $d_{90}$ value.

Conductivity:

A part of the dispersion was spin-coated onto a glass slide (26 mm×26 mm×1 mm) by means of a Spincoater (Chemat Technology KW-4A). The sample was dried for 10 min at 120° C. Following this, two opposing edges of the slide were coated with conductive silver. After the drying of the conductive silver, the two silver strips were contacted, and the surface resistance ($R_\square$) was measured using a Keithley 199 Multimeter. The layer thickness was determined with a Tencor Alpha Step 500 Surface Profiler. From the surface resistance and layer thickness d, the specific conductivity σ was determined according to $\sigma=1/(R_\square \times d)$.

Viscosity:

The viscosity of the dispersion was determined with a shear rate of 100 Hz and 20° C. using a rheometer (Haake Type RotoVisco 1 with a double-gap cylinder-system DG43).

Solids Content:

In order to determine the solids content, 5 g of the dispersion were dried for 14 hours at 100° C., and the solids content was determined by differential weighing.

Breakdown Voltage:

In order to determine the breakdown voltage, the voltage applied to the capacitors was increased by 1 V/s, starting at 0 V, and at the same time, the current was measured with a Keithley 199 System DMM. The breakdown voltage is defined as the first voltage value at which the current of a capacitor is above 1 mA.

Capacitance:

The capacitance (in microfarads) was measured at 20° C. and additionally at −45° C., at 120 Hz, using an LCR meter (Agilent 4284A).

Residual Current:

The residual current was measured 1 min after the application of an operating voltage of 110 V by means of a multimeter (Keithley 199).

Determination of Molecular Weight:

The numerical mean of the molecular weight of the impregnating agent was determined using gel permeation chromatography (GPC) with PEG-polymer standards for calibration from Aldrich. Unless otherwise indicated, all molecular weight figures refer to the numerical mean.

Mean Value:

Unless otherwise specified in this context, the mean or average value refers to the arithmetic mean or average.

Boiling Points and Melting Points

The measurements of boiling points and melting points are carried out at 1.01325 bar and in air.

EXAMPLES

Example 1

Manufacture of a Dispersion of Conductive Polymers 868 g de-ionised water, 330 g of an aqueous polystyrene sulfonic acid solution with an average molecular weight of 70000 and a solids content of 3.8% by weight were placed in a 2 l three-necked flask with stirrer and internal thermometer. The reaction temperature was held between 20 and 25° C. 5.1 g 3,4-ethylene dioxythiophene were added while stirring. The solution was stirred for 30 minutes. Following this, 0.03 g iron(III)-sulfate and 9.5 g sodium persulfate were added and the solution was stirred for a further 24 h.

Upon completion of the reaction, 100 ml of a strongly acidic cationic exchanger (Lewatit S100, Lanxess AG) and 250 ml of a weakly basic anionic exchanger (Lewatit MP 62, Lanxess AG) were added to remove inorganic salts, and the solution was stirred for a further 2 h. The ionic exchanger was filtered off.

Example 2

Manufacture of a Dispersion of Conductive Polymers

The poly(3,4-ethylene dioxythiophene)/polystyrene sulfonate-dispersion from Example 1 was homogenised twice under a pressure of 250 bar in a high pressure homogeniser. Following this, the dispersion was concentrated to a solids content of 2.5%.

100 g of this dispersion and 10 g ethylene glycol were stirred intensively in a glass beaker with a stirrer and then adjusted to a pH value of 3 with aqueous ammonia.

The particle size $d_{50}$ of the dispersion obtained in this manner was 40 nm.

Example 3

Manufacture of a Dispersion of Conductive Polymers

The poly(3,4-ethylene dioxythiophene)/polystyrene sulfonate-dispersion from Example 1 was homogenised four times under a pressure of 250 bar in a high pressure homogeniser. Following this, the dispersion was concentrated to a solids content of 2.5%.

100 g of this dispersion and 10 g ethylene glycol were stirred intensively in a glass beaker with a stirrer and then adjusted to a pH value of 3 with aqueous ammonia.

The particle size $d_{50}$ of the dispersion obtained in this manner was 29 nm.

Example 4

Manufacture of a Homogenised Dispersion of Conductive Polymers

The poly(3,4-ethylenedioxythiophene)/polystyrene sulfonate dispersion from Example 1 was homogenised five times under a pressure of 1500 bar in a high pressure homogeniser. Following this, the dispersion was concentrated to a solids content of 2.5% in a rotary evaporator and then additionally homogenised another five times at a pressure of 1500 bar in the high pressure homogeniser.

100 g of this dispersion and 10 g ethylene glycol were stirred intensively in a glass beaker with a stirrer and then adjusted to a pH value of 3 with aqueous ammonia.

The particle size $d_{10}$ of 16 nm, particle size $d_{50}$ of 20 nm and particle size $d_{90}$ of 36 nm was determined from the dispersion obtained in this manner.

The conductivity of the dispersion according to the above method was 455 S/cm.

Example 5

Manufacture of a Homogenised Dispersion of Conductive Polymers

The poly(3,4-ethylenedioxythiophene)/polystyrene sulfonate-dispersion from Example 1 was homogenised five times under a pressure of 1500 bar in a high pressure homogeniser. Following this, the dispersion was concentrated to a solids content of 2.5% and then additionally homogenised another five times at a pressure of 1500 bar in the high pressure homogeniser.

100 g of this dispersion and 15 g polyethylene glycol 400 (PEG 400) were stirred intensively in a glass beaker with a stirrer and then adjusted to a pH value of 3 with aqueous ammonia.

The particle size $d_{50}$ of the dispersion obtained in this manner was 20 nm.

Comparative Example 1

Manufacture of a Dispersion of Conductive Polymers

The poly(3,4-ethylene dioxythiophene)/polystyrene sulfonate-dispersion from Example 1 was homogenised once under a pressure of 100 bar in a high pressure homogeniser. Following this, the dispersion was concentrated to a solids content of 2.5%.

100 g of this dispersion and 10 g ethylene glycol were stirred intensively in a beaker with a stirrer and then adjusted to a pH value of 3 with aqueous ammonia.

The particle size $d_{50}$ of the dispersion obtained in this manner was 91 nm.

Comparative Example 2

Manufacture of a Dispersion of Conductive Polymers

The poly(3,4-ethylene dioxythiophene)/polystyrene sulfonate-dispersion from Example 1 was homogenised twice under a pressure of 100 bar in a high pressure homogeniser. Following this, the dispersion was concentrated to a solid content of 2.5%.

100 g of this dispersion and 10 g ethylene glycol were stirred intensively in a glass beaker with a stirrer and then adjusted to a pH value of 3 with aqueous ammonia.

The particle size $d_{50}$ of the dispersion obtained in this manner was 72 nm.

Example 6

6.1. Manufacture of Oxidised Electrode Bodies

A porous aluminium film formed at 150 V with dimensions 131 mm×3 mm (anode film) and a porous aluminium film with dimensions 145 mm×3 mm (cathode film) were each provided with a contact wire and then each wound with two cellulose separator papers and fixed with an adhesive tape. 20 of these oxidised electrode bodies were manufactured. The separator paper of the oxidised electrode bodies was then carbonised in an oven at 300° C.

6.2 Manufacture of the Solid Electrolytes

The oxidised electrode bodies from 6.1 were immersed for 15 min in the dispersion from Example 4. This was followed by drying at 150° C. for 30 min. Immersion and drying were repeated two more times. The capacitors were then immersed in an aqueous impregnation solution comprising 50% by weight polyethylene glycol 400 (PEG 400) with a melting point of 4 to 8° C. for 15 min. This was followed by drying at 120° C. for 30 min.

The mean electrical values of respectively 10 of the capacitors manufactured in the manner described above are presented in Table 1. The breakdown voltage (BDV) was determined for the remaining 10 capacitors.

Example 7

Capacitors were manufactured by analogy with Example 6, but, by way of difference, these were immersed in an ethanol solution comprising 50% by weight polyethylene glycol 400 (PEG 400) instead of in an aqueous solution of polyethylene glycol as in Example 6. The mean electrical values of the capacitors manufactured in this manner are shown in Table 1.

Example 8

Capacitors were manufactured by analogy with Example 6, but, by way of difference, these to were post-immersed in an aqueous solution comprising 50% by weight polyethylene glycol monoallylether (Polyglycol A250 manufactured by Clariant) with a melting point of −20° C. instead of in an aqueous solution of polyethylene glycol as in Example 6.

The mean electrical values of the capacitors manufactured in this manner are shown in Table 1.

Comparative Example 3

Electrode bodies were manufactured by analogy with Example 6.1, and these were immersed for 15 min in the dispersion from Example 5. This was followed by drying at 150° C. for 30 min. Immersion and drying were repeated two more times. The mean electrical values of the capacitors manufactured in this manner are shown in Table 1. The mean residual currents at 110 V could not be measured, because individual capacitors had already broken down electrically at this voltage.

Comparative Example 4

Capacitors were manufactured by analogy with Example 6, but, by way of difference, these were post-immersed in an aqueous solution comprising 50% by weight gamma-butyrolactone (manufactured by Aldrich) instead of in an aqueous solution of polyethylene glycol as in Example 6. The mean electrical values of the capacitors manufactured in this manner are shown in Table 1. The mean residual currents at 110 V could not be measured, because individual capacitors had already broken down electrically at this voltage.

TABLE 1

| | Residual current (□A) | BDV (V) | Capacitance (µF) at 20° C. | Change in capacitance (−45° C./20° C.) |
|---|---|---|---|---|
| Example 6 | 7.4 | 135 | 20.6 | −6% |
| Example 7 | 6.9 | 140 | 20.1 | −5% |
| Example 8 | 7.0 | 133 | 20.7 | −6% |
| Comparative Example 3 | | 125 | 19.2 | −31% |
| Comparative Example 4 | | 111 | 20.2 | −4% |

Table 1 shows that the post-immersion in polyethylene glycol or in a polyethylene glycol derivative leads to the highest breakdown voltage, at the same time as a low reduction in electrical capacitance at low temperatures. The addition of polyethylene glycol 400 in the dispersion leads to an undesirably large decrease in the electrical capacitance at low temperatures. With a post-immersion in gamma-butyrolactone, a high breakdown voltage cannot be achieved. With the examples according to the invention, the polymer solid electrolytic capacitors can be realised with an operating voltage greater than 100 V.

Example 9

Capacitors were manufactured by analogy with Example 6, but, by way of difference, these were immersed in the dispersion from Example 3 instead of the dispersion from Example 4 as in Example 6. The mean electrical values of the capacitors manufactured in this manner are shown in Table 2.

Example 10

Capacitors were manufactured by analogy with Example 6, but, by way of difference, these were immersed in the dispersion from Example 2 instead of the dispersion from Example 4 as in Example 6. The mean electrical values of the capacitors manufactured in this manner are shown in Table 2.

Comparative Example 5

Capacitors were manufactured by analogy with Example 6, but, by way of difference, these were impregnated in the dispersion from Comparative Example 2 instead of the dispersion from Example 4 as in Example 6. The mean electrical values of the capacitors manufactured in this manner are shown in Table 2.

Comparative Example 6

Capacitors were manufactured by analogy with Example 6, but, by way of difference, these were impregnated in the dispersion from Comparative Example 1 instead of the dispersion from Example 4 as in Example 6. The mean electrical values of the capacitors manufactured in this manner are shown in Table 2.

TABLE 2

| | $d_{50}$ (nm) | Capacitance (µF) at 20° C. | Change in capacitance (−45° C./20° C.) |
|---|---|---|---|
| Example 6 | 20 | 20.6 | −6% |
| Example 9 | 29 | 20.5 | −8% |
| Example 10 | 40 | 19.9 | −23% |
| Comparative Example 5 | 72 | 19.1 | −35% |
| Comparative Example 6 | 91 | 19.2 | −35% |

Table 2 illustrates that the temperature characteristic of the capacitor is strongly dependent upon the average particle size of the polymer dispersion. Polymer dispersions with a particle size ($d_{50}$) of 70 nm or less show a low reduction in the capacitance at low temperatures. With a particle size ($d_{50}$) of below 40 nm, particularly low reductions in capacitance are observed.

Example 11

Capacitors were manufactured by analogy with Example 6. The capacitance of the capacitors was measured and the capacitors were then stored in the oven at a temperature of 120° C. The capacitance was measured again after 196 hours storage. The mean electrical values of the capacitors manufactured in this manner are shown in Table 3.

Example 12

Capacitors were manufactured by analogy with Example 6, but, by way of difference, these were post-immersed in an aqueous solution comprising 50% by weight polyethylene glycol 400 (PEG 400) and 20% by weight tannin (manufactured by Aldrich) instead of in an aqueous solution of polyethylene glycol as in Example 6. The capacitance of the capacitors was measured, and the capacitors were then stored in the oven at a temperature of 120° C. The capacitance was measured again after 196 hours storage. The mean electrical values of the capacitors manufactured in this manner are shown in Table 3.

Example 13

Capacitors were manufactured by analogy with Example 6, but, by way of difference, these were post-immersed in an aqueous solution comprising 50% by weight polyethylene glycol 400 (PEG 400) and 5% by weight tannin instead of in an aqueous solution of polyethylene glycol as in Example 6. The capacitance of the capacitors was measured, and the capacitors were then stored in the oven at a temperature of 120° C. The capacitance was measured again after 196 hours storage. The mean electrical values of the capacitors manufactured in this manner are shown in Table 3.

TABLE 3

|  | Capacitance (µF) after manufacture | Capacitance (µF) after 196 h at 120° C. |
|---|---|---|
| Example 11 | 20.6 | 13.2 |
| Example 12 | 20.5 | 20.3 |
| Example 13 | 20.7 | 20.3 |

Table 3 shows that the long-term stability at high temperatures is considerably improved by stabilisers such as tannin in the post-immersion.

KEY TO REFERENCE NUMBERS

1 Electrode body
2 Electrode material
3 Dielectric
4 Surface
5 Anode body
6 Solid electrolyte
7 Capacitor body
8 Impregnating agent
9 Pores

The invention claimed is:

1. A method for manufacturing a capacitor, comprising the method steps:
    a) providing an electrode body made of an electrode material, wherein a dielectric at least partially covers a surface of the electrode material, to obtain an anode body;
    b) introducing a dispersion, which comprises particles of an electrically conductive polymer with a particle size ($d_{50}$) of 70 nm and less and a dispersing agent, into at least a part of the anode body;
    c) at least partial removing the dispersing agent, to obtain a capacitor body;
    d) introducing, into the capacitor body, a polyalkylene glycol or a polyalkylene glycol derivative or a combination of at least two thereof as an impregnating agent.

2. The method according to claim 1, wherein the impregnating agent is used in method step d) in the form of a solution comprising a solvent and the impregnating agent, and in a further method step e), the solvent is at least partially removed from the capacitor body.

3. The method according to claim 2, wherein the solvent is water or an alcohol or a mixture thereof.

4. The method according to claim 2, wherein the solution comprises the impregnating agent in a concentration in a range of from 1 to 99% by weight based on the total weight of the solution.

5. The method according to claim 1, wherein the impregnating agent has a molecular weight determined by gel permeation chromatography in a range of from 100 to 100,000 g/mol.

6. The method according to claim 1, wherein the impregnating agent is a polyethylene glycol.

7. The method according to claim 1, wherein the particles of the electrically conductive polymer comprise at least one polythiophene, polypyrrole or polyaniline or one of their derivatives or a mixture of at least two thereof.

8. The method according to claim 7, wherein the particles of the electrically conductive polymer comprise at least one polythiophene with repeating units selected from the group consisting of the general formula (I), the general formula (II) or the general formula (III) or a combination of at least two thereof, wherein
A denotes an optionally substituted $C_1$-$C_5$-alkylene residue,
R denotes a linear or branched, optionally substituted $C_1$-$C_{18}$-alkyl residue, an optionally substituted $C_5$-$C_{12}$-cycloalkyl residue, an optionally substituted $C_6$-$C_{14}$-aryl residue, an optionally substituted $C_7$-$C_{18}$-aralkyl residue, an optionally substituted $C_1$-$C_4$-hydroxyalkyl residue or a hydroxyl residue,
x denotes an integer from 0 to 8 and,
in the case that several residues R are bound to A, these can be identical or different.

9. The method according to claim 7, wherein the conductive polymer comprised in the particles is poly(3,4-ethylenedioxythiophene).

10. The method according to claim 1, wherein the particles additionally comprise at least one polymeric anion.

11. The method according to claim 10, wherein the polymeric anion is polystyrene sulfonic acid.

12. The method according to claim 1, wherein the dispersion comprises organic solvent, water or mixtures of organic solvent and water as dispersing agent.

13. The method according to claim 1, wherein the content of impregnating agent in the dispersion is less than 2.5% by weight based on the total weight of the dispersion.

14. The method according to claim 1, wherein a stabiliser is used in method step d) in addition to the impregnating agent.

15. The method according to claim 1, wherein the electrode material is a valve metal or NbO.

16. A capacitor obtainable through a method according to claim 1.

17. The capacitor according to claim 16, wherein the capacitor has the following properties:
(α1) a decrease of the capacitance of at most 20%; on reducing the temperature from 20° C. to −45° C., and
(α2) a breakdown voltage of at least 50 V.

* * * * *